(12) United States Patent
Furuya et al.

(10) Patent No.: US 7,156,640 B2
(45) Date of Patent: Jan. 2, 2007

(54) INSERT DIES, MOLDS, AND METHODS FOR FABRICATING THE SAME

(75) Inventors: Noboru Furuya, Suwa (JP); Satoshi Kimura, Suwa (JP)

(73) Assignee: Seiko Epson Corporation (JP)

( * ) Notice: Subject to any disclaimer, the term of this patent is extended or adjusted under 35 U.S.C. 154(b) by 196 days.

(21) Appl. No.: 11/023,095

(22) Filed: Dec. 22, 2004

(65) Prior Publication Data

US 2005/0139475 A1 Jun. 30, 2005

(30) Foreign Application Priority Data

Dec. 25, 2003 (JP) .............................. 2003-429406

(51) Int. Cl.
B29C 33/38 (2006.01)

(52) U.S. Cl. ...................... 425/195; 156/150; 156/267; 156/278; 156/280; 425/470; 425/810

(58) Field of Classification Search ................ 425/190, 425/195, 470, 810; 249/134, 135; 156/150, 156/267, 278, 280
See application file for complete search history.

(56) References Cited

U.S. PATENT DOCUMENTS

| | | | | |
|---|---|---|---|---|
| 4,828,769 A | * | 5/1989 | Maus et al. ................. | 264/1.31 |
| 4,845,000 A | * | 7/1989 | Takeoka et al. ............. | 264/1.1 |
| 5,344,304 A | * | 9/1994 | Tamura et al. .............. | 425/195 |
| 6,354,827 B1 | * | 3/2002 | Kerfeld ...................... | 425/195 |
| 6,630,048 B1 | * | 10/2003 | Pertusio et al. ............. | 156/150 |
| 6,752,615 B1 | * | 6/2004 | Uotani ........................ | 425/810 |

* cited by examiner

*Primary Examiner*—James P. Mackey
(74) *Attorney, Agent, or Firm*—Harness, Dickey & Pierce, P.L.C.

(57) ABSTRACT

A method for manufacturing an insert die with a pattern region to be transferred onto a molding part is provided. The method includes (a) adhering a first base member having the pattern region and a second base member with an adhesive material, and (b) sealing an exposed portion of the adhesive material by a metal film.

14 Claims, 5 Drawing Sheets

INSERT DIES, MOLDS, AND METHODS FOR FABRICATING THE SAME

RELATED APPLICATIONS

This application claims priority to Japanese Patent Application No. 2003-429406 filed Dec. 25, 2003 which is hereby expressly incorporated by reference herein in its entirety.

BACKGROUND

1. Technical Field

The present invention relates to insert dies, molds and methods for fabricating the same.

2. Related Art

An injection molding method of the like is known as a method to manufacture molded parts with plastic materials. The injection molding method uses molds including an insert die (partial mold) having a pattern of recesses and protrusions, and a mother mold in which the insert die is inserted. According to the conventional technique, it is difficult to manufacture insert dies and molds for molding micro structures (for example, optical parts) that require a high processing accuracy (for example, in the order of several tens of nanometers (nm)). Also, because multiple molded parts are fabricated with one mold, it is important to improve the durability of the mold.

It is an object of the present invention to improve the durability of insert dies and molds, and facilitate the process for manufacturing the same.

SUMMARY

A method for manufacturing an insert die in accordance with the present invention pertains to a method for manufacturing an insert die having a pattern region to be transferred onto a forming object, and includes: (a) adhering a first base member having the pattern region and a second base member with an adhesive material; and (b) sealing an exposed portion of the adhesive material by a metal film.

According to the present invention, the first base member having the pattern region is adhered to the second base member with an adhesive material, and exposed portions of the adhesive material are sealed with the metal film. Because the adhesive material is sealed, the adhesive material can be prevented from leaking out or falling out. Also, the first base member having the pattern region and the second base member are prepared independently from one another, such that an insert die having a specified thickness can be readily manufactured. Accordingly, the durability of an insert die is improved, and its manufacturing process is facilitated.

In the method for manufacturing an insert die, in the step (b), the metal film may be formed by depositing a plated film. By this, a metal film having a specified thickness can be readily formed.

In the method for manufacturing an insert die, the step (b) may be conducted with at least the pattern region coated with a protection film among the first and second base members. By this, the metal film can be formed on portions of the first and second base members which are exposed through the protection film.

In the method for manufacturing an insert die, in the step (a), an electroconductive adhesive material may be used as the adhesive material, and in the step (b), the plated film may be deposited by electroplating.

In the method for manufacturing an insert die, in the step (a), an insulating adhesive material may be used as the adhesive material, and in the step (b), the plated film may be deposited by electroless plating.

As a result, the plated film can be evenly deposited even on the exposed portion of the insulating adhesive material.

In the method for manufacturing an insert die, the step (b) may include ($b_1$) depositing a first plated film by electroless plating, and ($b_2$) depositing a second plated film on the first plated film by electroplating, thereby forming the metal film from the first and second plated films. By this, the metal film can be formed thick in a short time.

In the method for manufacturing an insert die, the step (a) may include ($a_1$) providing the adhesive material on at least one of the first and second base members, and ($a_2$) bringing adhesive surfaces of the first and second base members in contact with one another.

In the method for manufacturing an insert die, in the step (a), one of an epoxy resin adhesive material, an imide resin adhesive material, a ceramics adhesive material, an inorganic heat-resisting adhesive material, and an anaerobic impregnating adhesive material may be used as the adhesive material.

The method for manufacturing an insert die may include removing a part of the first and second base members, before the step (b). By so doing, the size of the insert die can be adjusted.

The method for manufacturing an insert die may further include polishing a surface of the metal film, after the step (b). By so doing, the size of the insert die can be adjusted.

A method for manufacturing a mold in accordance with the present invention includes mounting an insert die manufactured by any one of the above methods on a mother mold. According to the present invention, the durability of the mold can be improved, and its manufacturing process can be facilitated.

An insert die in accordance with the present invention pertains to an insert die having a pattern region to be transferred onto a molding part, and includes: a first base member having the pattern region; a second base member; an adhesive material for adhering the first base member and the second base member; and a metal film for sealing exposed portion of the adhesive material.

According to the present invention, the first base member having the pattern region is adhered to the second base member with an adhesive material, and exposed portions of the adhesive material are sealed with the metal film. Because the adhesive material is sealed, the adhesive material can be prevented from leaking out or falling out. Accordingly, the durability of an insert die can be improved.

In the insert die, the metal film may include a plated film.

A mold in accordance with the present invention includes the insert described above, and a mother mold having the insert die mounted thereon.

In accordance with the present invention, the durability of the mold can be improved.

DETAILED DESCRIPTION

Embodiments of the present invention are described below with reference to the accompanying drawings.

Figure 1:
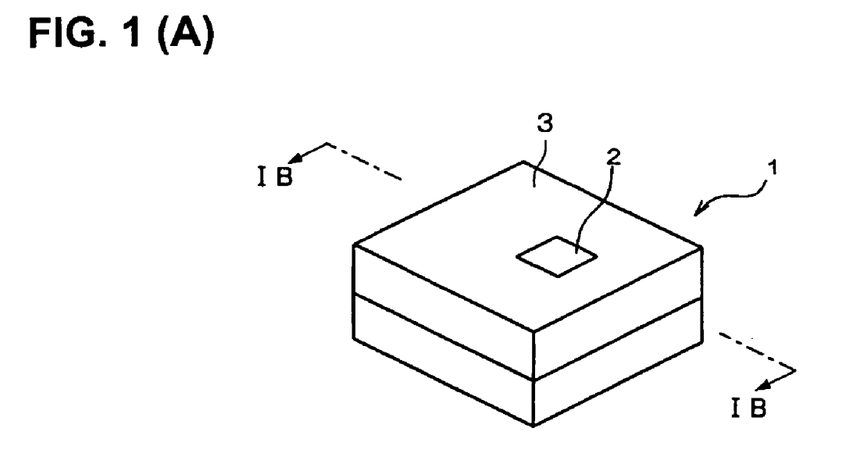
FIG. 1(A) and FIG. 1(B) are views for describing an insert die and a mold in accordance with an embodiment of the present invention.
Figure 2:
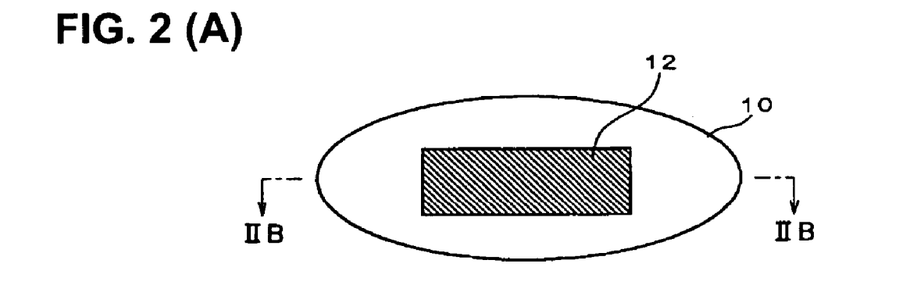
FIG. 2(A) and FIG. 2(B) are views for describing a method for manufacturing an insert die in accordance with an embodiment of the present invention.
Figure 3:
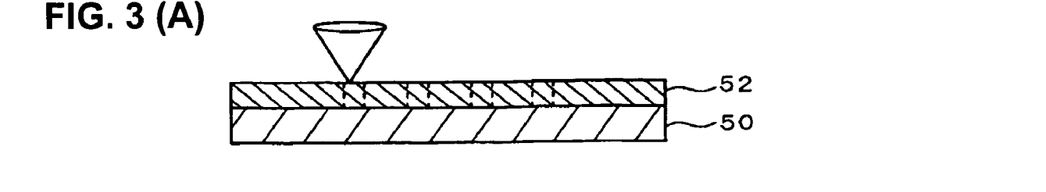
FIG. 3(A) through FIG. 3(D) are views for describing a method for manufacturing an insert die in accordance with an embodiment of the present invention.
Figure 4:
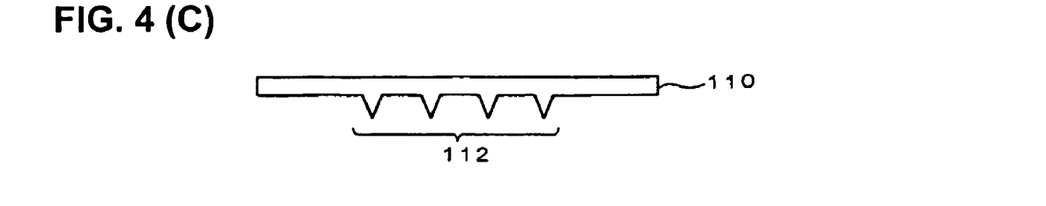
FIG. 4(A) through FIG. 4(C) are views for describing a method for manufacturing an insert die in accordance with an embodiment of the present invention.

FIG. 1(A) and FIG. 1(B) are views for describing a mold in accordance with an embodiment of the present invention, wherein FIG. 1(A) is a perspective view showing an external appearance of the mold, and FIG. 1(B) is a cross-sectional view taken along lines IB—IB of FIG. 1(A). FIG. 2(A) through FIG. 14 are views for describing methods for manufacturing an insert die or a mold in accordance with embodiments (including modified examples) of the present invention.

As shown in FIG. 1(A) and FIG. 1(B), a mold (for example, a metal mold) 1 includes an insert die (first mold) 2, and a mother mold (second mold) 3 in which the insert die 2 is fitted. The insert die 2 can be attached to and detached from the mother mold 3. The insert die 2 has a pattern region 12 to be transferred onto a molding part (see for example FIG. 2(B)). The pattern region 12 may be formed on one surface of the insert die 2. The mold 1 is mounted on a molding machine (for example, an injection molding machine). Melted resin or the like is filled in a cavity 4 of the molding 1, and pressurizing, cooling and solidification steps are conducted thereon. As a result, a molded part having an entire configuration of the mold 1 transferred and a pattern configuration of the pattern region 12 of the insert die 2 transferred can be manufactured. The mold 1 may be a device for manufacturing a micro structure such as an optical component (for example, a light guide for a liquid crystal device).

A method for manufacturing an insert die in accordance with an embodiment of the present invention is described.

As shown in FIG. 2(A) and FIG. 2(B), first, a first base member 10 having a pattern region 12 is formed. FIG. 2(A) is a plan view of the first base member, and FIG. 2(B) is a cross-sectional view taken along lines IIB—IIB in FIG. 2(A). It is noted that the pattern region in FIG. 2(A) and FIG. 2(B) are shown schematically.

The first base member 10 may be a substrate (for example, a thin plate). The first base member 10 may be formed from a metal, for example, but is not limited to a specific material as long as the heat resistance and hardness required in the process for manufacturing a molded part can be obtained. The thickness thereof may be in a range between about 0.1 mm and about 3.0 mm, for example. The pattern region 12 is formed in one surface of the first base member 10. The height difference among recesses and protrusions of the pattern in the pattern region 12 may be in a range between about 30 nm and about 100 μm, for example. The first base member 10 can be manufactured in a manner similar to a method for manufacturing a so-called stamper, which is used in an optical disk forming process or the like.

A concrete method for manufacturing the first base member 10 is described with reference to FIG. 3(A) through FIG. 3(D). As shown in FIG. 3(A), after at least one of surfaces (a pattern forming surface) of a glass original board 50 is polished and washed, a photoresist 52 is coated on the polished surface of the glass original board 50, and then light energy (for example, laser beam) is intermittently irradiated (for exposure) corresponding to a pattern configuration.

Next, as shown in FIG. 3(B), the portion of the photoresist 52 that is exposed to light is developed, thereby forming minute patterns on the photoresist 52.

Next, as shown in FIG. 3(C), an electroconductive film composed of silver (Ag), nickel (Ni) or the like is formed over the minute patterns formed on the photoresist 52 by a sputter method, a vapor deposition method, an electroless plating method or the like. By using the electroconductive film formed on the photoresist 52 as one of electrodes, an electrical casting (electroforming) using a solution such as a nickel amiosulfonate solution or the like is conducted, to deposit nickel to a desired thickness.

Then, the nickel deposited on the photoresist 52 is peeled off the glass original board 50, and resist remove and washing are conducted. Accordingly, as shown in FIG. 3(D), a first base member 10 composed of nickel having a pattern region 12 with a pattern of minute recesses and protrusions formed therein is formed.

It is noted that, by using the first base member 10 formed in the manner described above as a master, a mother die (female die) having a reversed pattern of the pattern formed on the master may be duplicated; further by using the mother die, a son die (male die) having the same pattern as that of the master may be duplicated; and the duplicated son die can be used as the first base member 10. Alternatively, a mother die that is a duplicate of a master may be used as the first base member 10. In this case, a master having a reversed pattern of a pattern to be formed is formed, and a mother die may be duplicated from this master.

A modified example of the concrete method for manufacturing the first base member 10 is described with reference to FIG. 4(A) through FIG. 4(C). More specifically, the first base member 10 may be manufactured by a mechanical processing method.

First, as shown in FIG. 4(A), a mechanical processing using a cutting tool 160 such as a byte is performed, thereby cutting recessed sections at predetermined positions in a metal original board 150 to form recessed sections 152. The recessed sections 152 define a reversed pattern of a specified recessed and protruded pattern that is to be formed in a first base member 110. It is noted that the recessed sections 152 can be formed by a laser beam processing method, an electron beam processing method, or any one of various mechanical processing methods, beside the method using a cutting tool such as a byte.

Next, as shown in FIG. 4(B), an electroforming is conducted, thereby depositing nickel on the metal original board 150 to a desired thickness. Concrete details of this processing are similar to those described above (see FIG. 3(C)), and therefore a detailed description thereof is omitted.

Thereafter, the nickel deposited on the metal original board 150 is separated from the metal original board 150, and resist removal and washing are conducted. As a result, as shown in FIG. 4(C), a first base member 110 composed of nickel having a pattern region 112 with a pattern of minute recesses and protrusions formed therein is formed. According to this method, because the pattern is formed in the metal original board 150 by cutting recessed portions, a relatively highly accurate processing can be performed.

Figure 5:
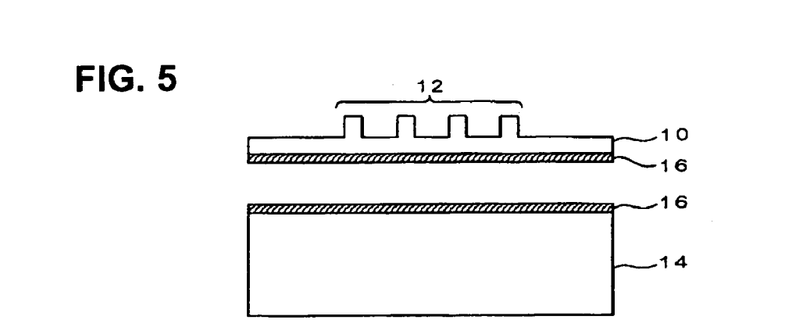
FIG. 5 is a view for describing a method for manufacturing an insert die in accordance with an embodiment of the present invention.

After the first base member 10 has been prepared according to the aforementioned method, the first base member 10 and a second base member 14 are adhered together with an adhesive material 16, as shown in FIG. 5. The second base member (base material) 14 may be a substrate, and may be formed to be thicker than the first base member 10. The second base member 14 may be formed from a metal, for example, but is not limited to any specific material, and may be formed from the same material as that of the first base member 10. The first base member 10 and the second base member 14 are bonded together with the adhesive material 16 interposed between them. In the example shown in FIG. 5, the adhesive material 16 is provided on both of the first base member 10 and the second base member 14, but may be provided on one of them. As the adhesive material 16, an adhesive in a liquid state or a gel state may be used. Alternatively, a solid adhesive sheet may be used as the adhesive material 16.

Before the step of bonding the first and second base members 10 and 14, an adhering surface (a rear surface of the surface where the pattern region 12 is formed) of the first base member 10 may be polished, thereby adjusting surface roughness, thickness irregularity and warping of the first base member 10. In this polishing step, the surface is polished such that its surface roughness Ra becomes to be about 0.05–0.1 μm, thickness irregularity 5 μm or smaller, and warping 300 μm or smaller. Alternatively, an adhering surface of the second base member 2 may be polished.

As the adhesive material 16, the following can be used: (1) an epoxy resin adhesive material containing denatured epoxy, denatured polyamine or the like as a main composition, (2) an imide resin adhesive material containing polyimide or the like as a main composition, (3) a ceramics adhesive material containing silica, mica, alumina or the like as a main composition, which has a high heat resisting property (for example, a heat resisting property at about 600° C. and higher), (4) an organic heat-resisting adhesive material containing a powder material that includes alumina oxide, zirconium oxide, manganese dioxide, or inorganic borate as a main composition and a solvent of silicon compounds as a main composition, (5) an anaerobic impregnating adhesive material that contains diester methacrylate as a main composition and has a low viscosity (for example, about 40–600 mPa·s at 25° C.), or the like Also, an insulating adhesive material, or an electroconductive adhesive material (for example, one containing electroconductive particles in binder) may be used as the adhesive material 16.

The adhesive material 16 may be supplied by using a spray coating method, or a spin coat method (rotation coating method) when the adhesive material 16 has a low viscosity. By using these methods, the uniformity in the thickness of the adhesive material 16 (for example, the thickness within a specified range of about ±2 μm) within the coated surface can be promoted. It is noted that, after the adhesive material 16 has been supplied, the first and second base members 10 and 14 may be placed in a vacuum chamber to perform gas removal (degassing), and kept standing in the vacuum chamber to complete the step of adhering the first and second base members 10 and 14. By so doing, bubbles and foreign matters can be removed from the adhesive material 16, and the adhesion (bonding property) between the first base member 10 and the second base member 14 can be improved.

When the adhesive material 16 has a high viscosity, it may be coated by using a coating tool such as a brush, or may be coated by directly dripping. It is noted that, in this case also, the first and second base members 10 and 14 may be placed in a vacuum chamber, to perform gas removal (degassing) of the adhesive material 16, and spread the adhesive material 16 across the entire adhering surface, and kept standing in the vacuum chamber to complete the step of adhering the first and second base members 10 and 14.

Figure 6:
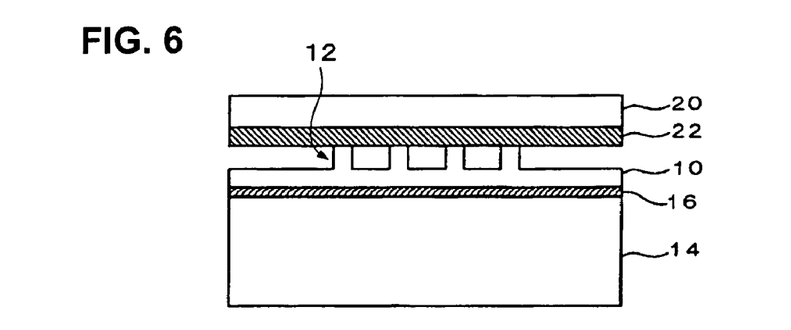
FIG. 6 is a view for describing a method for manufacturing an insert die in accordance with an embodiment of the present invention.

As shown in FIG. 6, the adhering surfaces of the first and second base members 10 and 14 are mutually abutted, thereby adhering them together. In the example shown in FIG. 6, a tool 20 having a resin film 22 formed on one of surfaces thereof is used, a surface of the tool 20 where the resin film 22 is formed is abutted against the first base member 10 and pressed such that the first base member 10 is adhered to the second base member 14. The resin film 22 may be formed by using an organic material containing polyimide, fluorine or the like. The pattern region 12 may be pressed by the tool 20 (the resin film 22). As a modified example, a protection film (for example, a polyimide film) (not shown) that covers at least the pattern region 12 may be formed on the first base member 10, and the surface of the protection film may be pressed. By so doing, the pattern configuration of the pattern region 12 is prevented from being damaged by pressing of the tool 20. The protection film may be separated after the step of hardening the adhesive material 16 to be described below, or may be separated after a wirecut electric discharge machining to be described below.

Next, the first and second base members 10 and 14, while their pressed state is maintained, are placed in an atmosphere at temperatures above room temperature for drying, thereby hardening the adhesive material 16. For the drying process, the temperature may be set within a range between about 50° C. and about 150° C. Also, the processing time may be appropriately set according to the kind, characteristic and the like of the adhesive material 16. For example, when an epoxy resin adhesive material is used as the adhesive material 16, a heat treatment at 150° C. for about 1.5 hours may be performed.

Figure 7:
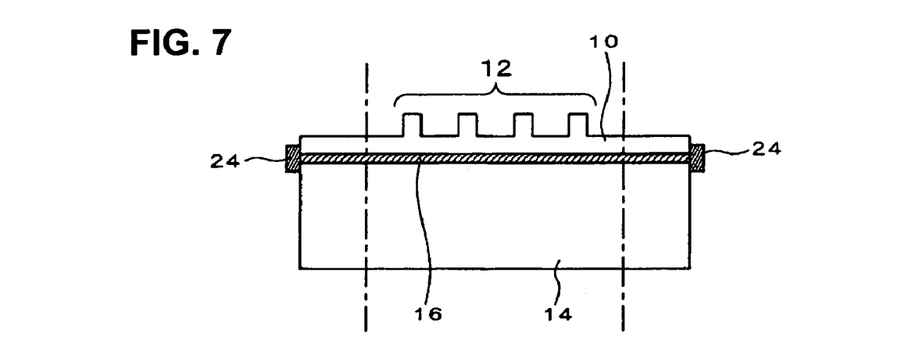
FIG. 7 is a view for describing a method for manufacturing an insert die in accordance with an embodiment of the present invention.

If necessary, as shown in FIG. 7, a part of the first and second base members 10 and 14 may be removed. For example, side end portions of the first and second base members 10 and 14 may be cut along a lamination direction of the first and second base members 10 and 14. By so doing, the size (for example, the size in the width direction) of the insert die 2 can be adjusted to the mother mold 3.

Described more concretely, when the first and second base members 10 and 14 are both composed of an electroconductive material, an electroconductive material (for example, silver paste) is coated in a manner to contact the respective side end portions of the first and second base members 10 and 14, to thereby electrically connect the first and second base members 10 and 14. In other words, the first and second base members 10 and 14 are electrically connected with connection sections 24. Next, by a wirecut electric discharge machining, unnecessary portions of the first and second base members 10 and 14, for example, surrounding portions of the pattern region 12 are removed while leaving a predetermined region including the pattern region 12. In this manner, the first and second base members 10 and 14 are bonded together including unnecessary portions thereof, and then the unnecessary portions are removed, such that the first and second base members 10 and 14 can be provided with a large adhering surface, and secure a large bonding force. Accordingly, the first and second base members 10 and 14 can be prevented from being separated.

As a modified example, the electrical connection between the first and second base members 10 and 14 may be achieved by using an electroconductive adhesive material as the adhesive material 16. By this, the aforementioned connection sections 24 and the step of forming the same can be omitted, such that the manufacturing process can be simplified.

Figure 8:
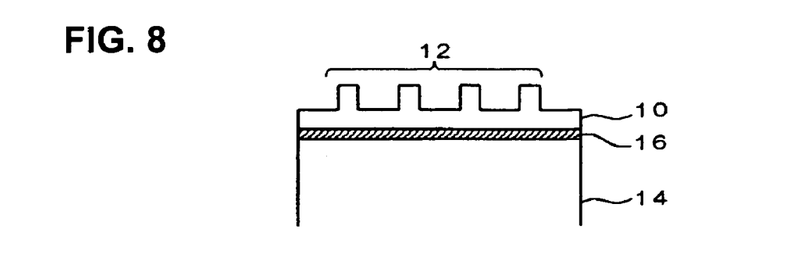
FIG. 8 is a view for describing a method for manufacturing an insert die in accordance with an embodiment of the present invention.

In this manner, as shown in FIG. 8, an insert die including the first base member 10 having the pattern region 12, the second base member 14 and the adhesive material 16 that adheres the first and second base members 10 and 14 together can be manufactured. In the insert die, the adhesive material 16 is exposed between the first base member 10 and the second base member 14. The adhesive material 16 may be exposed, for example, at side end sections of the first and second base members 10 and 14. In the present embodiment, the exposed portions of the adhesive material 16 are sealed. The entire exposed portions of the adhesive material 16 may be completely sealed.

FIG. 9 through FIG. 14 are views for describing the process of sealing the exposed portions of the adhesive material. More specifically, exposed portions of the adhesive material 16 are sealed by a metal film 30. For example, the metal film 30 is formed along the entire circumference of the side end sections of the first and second base members 10 and 14. The metal film 30 may be formed by a plating process to deposit a plated film. By this method, the metal film 30 having a predetermined thickness (for example, about 10–100 μm) can be readily formed. Also, when the first and second base members 10 and 14 are formed from a metal material, the plated film can be prevented from being separated from the first and second base members 10 and 14, as the plated film has a high adhesiveness to the metal. The plating process may be an electroless plating process, an electroplating process, or a process including both of the above.

Figure 9:
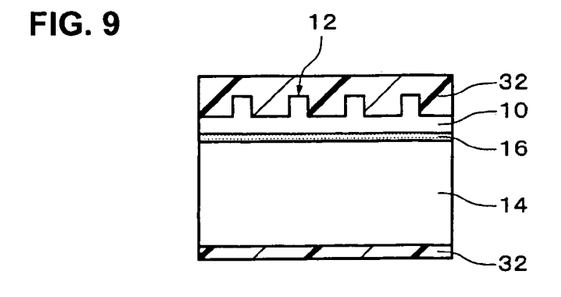
FIG. 9 is a view for describing a method for manufacturing an insert die in accordance with an embodiment of the present invention.

When the plating process is conducted, a protection film (mask) 32 is formed on a part of the first and second base members 10 and 14, as shown in FIG. 9. By so doing, the metal film 30 can be formed on portions exposed through the protection film 32 among the first and second base members 10 and 14. The protection film 32 is formed to cover at least the pattern region 12. In the example shown in FIG. 9, the protection film 32 is formed on a surface (upper end section) on the side of the first base member 10 and a surface (lower end section) on the side of the second base member 14, in other words, portions excluding the side end sections. The protection film 32 may be formed from resin, and is the one which does not dissolve even when dipped in a plating solution.

Figure 10:
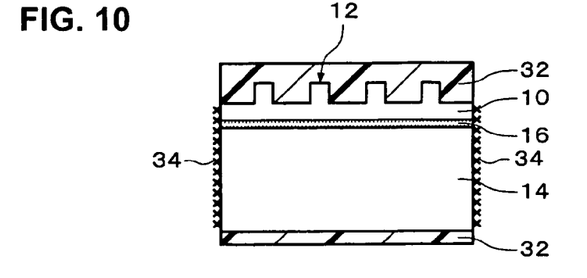
FIG. 10 is a view for describing a method for manufacturing an insert die in accordance with an embodiment of the present invention.

When an insulating adhesive material is used as the adhesive material 16, an electroless plating may be conducted. By so doing, a plated film can be evenly deposited on exposed portions of the adhesive material 16 that is insulating. More specifically, first, as shown in FIG. 10, catalyst (for example, palladium (Pd)) 34 is attached to the first and second base members 10 and 14. The step of attaching the catalyst 34 may be performed by dipping the first and second base members 10 and 14 in a predetermined solution, or may be performed by using a droplet discharge method such as an ink jet method. When the protection film 32 is formed, the catalyst 34 is attached to portions exposed through the protection film 32. The catalyst 34 is attached to side end sections of the first and second base members 10 and 14. The catalyst 34 is attached to exposed portions of the adhesive material 16. It is noted that, before the step of attaching the catalyst, the step of degreasing the first and second base members 10 and 14, and, if necessary, the step of removing (for example, etching) oxide films on the surface of the first and second base members 10 and 14 may be performed. By removing the oxide films, the adhesion of the plated film can be improved.

As a modified example, the catalyst 34 may be attached to the entire surface (including the exposed portions of the adhesive material 16) of the first and second base members 10 and 14, and then the protection film 32 described above may be formed on predetermined portions of the first and second base members 10 and 14.

Figure 11:
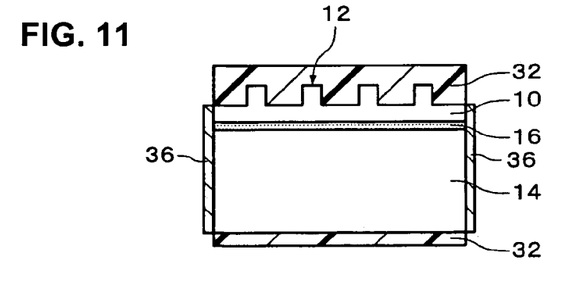
FIG. 11 is a view for describing a method for manufacturing an insert die in accordance with an embodiment of the present invention.

As shown in FIG. 11, a first plated film 36 is deposited on regions of the catalyst 34. The first plated film 36 is, formed in a manner to cover side end portions of the first and second base members 10 and 14. The first plated film 36 covers the exposed portions of the adhesive material 16. The first plated film 36 can be formed by dipping the first and second base members 10 and 14 in a plating solution. The metal material of the first plated film 36 may be, for example, nickel (Ni).

Figure 12:
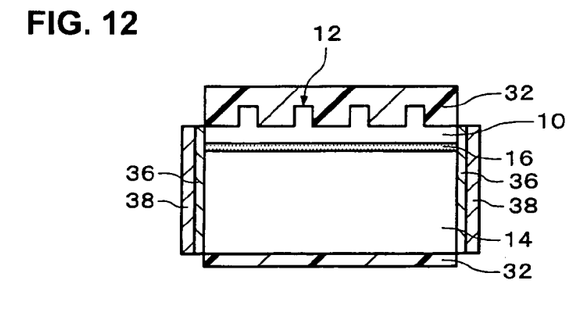
FIG. 12 is a view for describing a method for manufacturing an insert die in accordance with an embodiment of the present invention.

If necessary, as shown in FIG. 12, a second plated film 38 is deposited on the first plated film 36. The second plated film 38 may be formed thicker than the first plated film 36. For example, the first plated film 36 may be formed to a thickness of about 1–10 μm, and the second plated film 38 may be formed to a thickness of about 10–100 μm. The second plated film 38 may be formed from a material different from (for example, a material that is harder or softer than) that of the first plated film 36, or may be formed from the same material. The metal material of the second plated film 38 may be, for example, nickel (Ni), phosphorous (P), tungsten (W), cobalt (Co) or chrome (Cr). The second plated film 38 may be formed by electroplating, for example. By this, a thick plated film can be formed in a shorter time compared to electroless plating. It is noted that, as a modified example, the above-described step of forming the second plated film 38 may be omitted, and the metal film may be formed from the first plated film 36 (alone).

Figure 13:
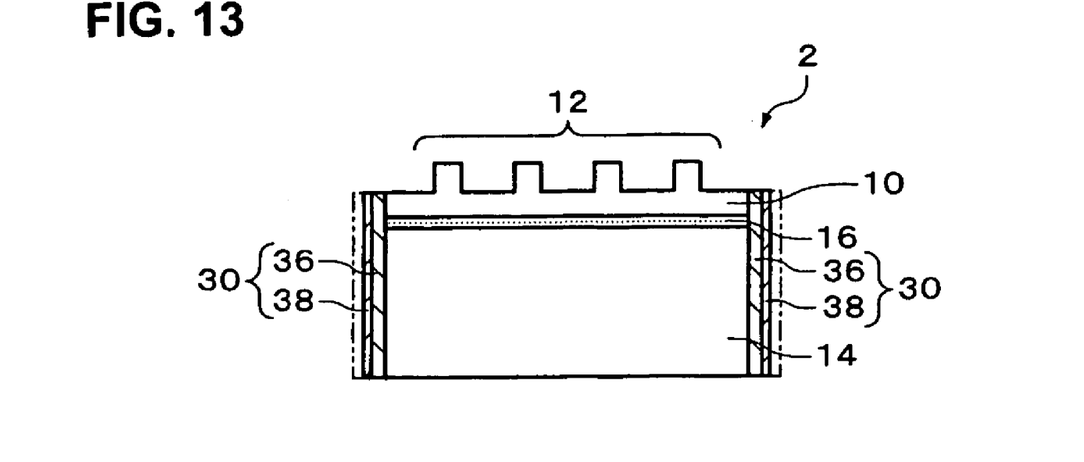
FIG. 13 is a view for describing a method for manufacturing an insert die in accordance with an embodiment of the present invention.

In this manner, the metal film 30 including the first and second plated films 36 and 38 can be formed. If necessary, as shown in FIG. 13, the surface of the metal film 30 (the second plated film 38 in FIG. 13) may be polished. The polishing may be conducted by a mechanical polishing method, a chemical polishing method, or a method combining them. By so doing, the size of the first and second base members 10 and 14 can be adjusted. In other words, the size (for example, the size in the width direction) of the insert die 2 shown in FIG. 13 can be adjusted to that of the mother die 3 (see for example FIG. 1(B)).

Figure 14:
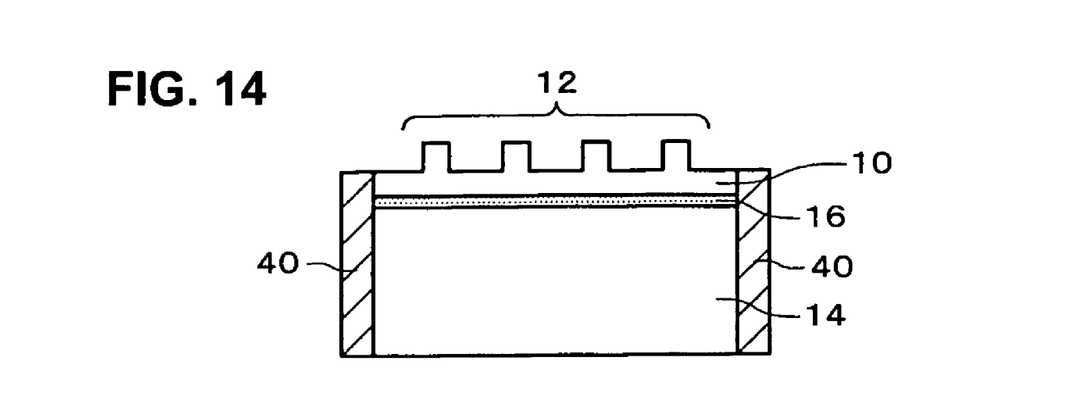
FIG. 14 is a view for describing a method for manufacturing an insert die in accordance with a modified example of an embodiment of the present invention.

As a modified example, as shown in FIG. 14, the metal film 40 may be formed by electroplating (alone), if an electroconductive adhesive material is used as the adhesive material 16. When the adhesive material 16 is conductive, exposed portions of the adhesive material 16 can be covered with a plated film formed by electroplating.

An insert die in accordance with an embodiment of the present invention includes a first base member 10, a second base member 14, an adhesive material 16 that adheres the first base member 10 and the second base member 14, and a metal film 30 that seals exposed portions of the adhesive material 16. The insert die has a pattern region 12 that is to be transferred onto a molded part. The metal film 30 includes a plated film.

A method for manufacturing a mold in accordance with an embodiment of the present invention includes mounting the aforementioned insert die 2 (see FIG. 13) on a mother mold 3 (see FIG. 1(A) and FIG. 1(B)). It is noted that a mold in accordance with the present embodiment includes the aforementioned insert die 2 and the mother mold 3 on which the insert die 2 is mounted. Details of the insert die 2, the mold, and the method for manufacturing the same can be derived from the details of the method for manufacturing an insert die described above.

By attaching the mold 1 to an ordinary injection molding machine or a sheet molding machine, resin products and plastic material products can be formed by injection molding and sheet molding, respectively. In effect, experiments were conducted by the inventor of the present invention, and it was confirmed that, when a mold including an insert die manufactured by the method described above is attached to an ordinary injection molding machine, and molding is performed at a mold temperature at 105° C., a resin temperature at 300° C., an injection rate at 100 mm/s or greater, and a pressure kept at 1000 kg/cm$^2$, excellent molded parts (micro structures) can be formed by injection molding.

In accordance with the present embodiment, the first base member 10 having the pattern region 12 and the second base member 14 are adhered together with the adhesive material 16, and exposed portions of the adhesive material 16 are sealed by the metal film 30. Because the adhesive material 16 is sealed, the adhesive material 16 is prevented from leaking outside or falling off. Alternatively, the adhesive material 16 can be prevented from gradually breaking off into power and falling off as a result of temperature, pressure, vibration and the like applied during the process of manufacturing molded parts. Accordingly, the durability of insert dies and molds can be improved. Also, because the first base member 10 having the pattern region 12 and the second base member 14 are prepared independently from one another, the insert die 2 (or the mold 1) can be readily formed into a predetermined thickness. Accordingly, the process of manufacturing the insert die 2 (or the mold 1) can be simplified.

The present invention is not limited to the embodiments described above, and many modifications can be made. For example, the present invention may include compositions that are substantially the same as the compositions described in the embodiments (for example, a composition with the same function, method and result, or a composition with the same objects and result). Also, the present invention includes compositions in which portions not essential in the compositions described in the embodiments are replaced with others. Also, the present invention includes compositions that achieve the same functions and effects or achieve the same objects of those of the compositions described in the embodiments. Furthermore, the present invention includes compositions that include publicly known technology added to the compositions described in the embodiments.

What is claimed is:

1. A method for manufacturing an insert die having a pattern region to be transferred onto a molding part, the method for manufacturing the insert die comprising:
    (a) adhering a first base member having the pattern region and a second base member with an adhesive material; and
    (b) sealing an exposed portion of the adhesive material by a metal film.

2. The method for manufacturing an insert die according to claim 1, wherein, in the step (b), the metal film is formed by depositing a plated film.

3. The method for manufacturing an insert die according to claim 1, wherein the step (b) is conducted with at least the pattern region coated with a protection film among the first and second base members.

4. The method for manufacturing an insert die according to claim 1, wherein:
    in the step (a), an electroconductive adhesive material is used as the adhesive material; and
    in the step (b), the metal film is deposited by electroplating.

5. The method for manufacturing an insert die according to claim 1, wherein:
    in the step (a), an insulating adhesive material is used as the adhesive material; and
    in the step (b), the metal film is deposited by electroless plating.

6. The method for manufacturing an insert die according to claim 1, wherein the step (b) includes:
    ($b_1$) depositing a first plated film by electroless plating; and
    ($b_2$) depositing a second plated film on the first plated film by electroplating, thereby forming the metal film from the first and second plated films.

7. The method for manufacturing an insert die according to claim 1, wherein the step (a) includes:
    ($a_1$) providing the adhesive material on at least one of the first and second base members; and
    ($a_2$) bringing adhesive surfaces of the first and second base members in contact with one another.

8. The method for manufacturing an insert die according to claim 1, wherein, in the step (a), one of an epoxy resin adhesive material, an imide resin adhesive material, a ceramics adhesive material, an inorganic heat-resisting adhesive material, and an anaerobic impregnating adhesive material is used as the adhesive material.

9. The method for manufacturing an insert die according to claim 1, comprising removing a part of the first and second base members, before the step (b).

10. The method for manufacturing an insert die according to claim 1, further comprising polishing a surface of the metal film, after the step (b).

11. A method for manufacturing a mold, comprising mounting an insert die manufactured by the method recited in claim 1 on a mother mold.

12. An insert die having a pattern region to be transferred onto a molding part, comprising:
    a first base member having the pattern region;
    a second base member;
    an adhesive material for adhering the first base member and the second base member; and
    a metal film for sealing an exposed portion of the adhesive material.

13. The insert die according to claim 12, wherein the metal film includes a plated film.

14. A mold comprising the insert die recited in claim 12, and a mother mold having the insert die mounted thereon.

* * * * *